United States Patent [19]
Hargarter et al.

[11] Patent Number: 5,593,775
[45] Date of Patent: Jan. 14, 1997

[54] SINGLE-LAYERED HOT-MELT FILM ADHESIVE WHICH CAN BE WOUND ON A REEL WITHOUT USING RELEASE OR SEPARATING AGENTS RUNS EASILY ON MACHINES AND IS MADE FROM OLEFIN COPOLYMERS

[75] Inventors: Nicole Hargarter, Schneverdingen; Dirk Schultze, Fallingbostel; Ulrich Reiners, Neuenkirchen, all of Germany

[73] Assignee: Wolff Walsrode Aktiengesellschaft, Walsrode, Germany

[21] Appl. No.: 540,410

[22] Filed: Oct. 6, 1995

[30] Foreign Application Priority Data

Oct. 14, 1994 [DE] Germany ............. 44 36 775.9

[51] Int. Cl.$^6$ ................................. B32B 7/12
[52] U.S. Cl. .................. 428/349; 428/355 EN; 428/516; 428/343
[58] Field of Search ..................... 428/343, 355, 428/356, 516, 349

[56] References Cited

U.S. PATENT DOCUMENTS

| | | | |
|---|---|---|---|
| 4,091,195 | 5/1978 | Vitek ........................... | 428/356 X |
| 4,331,576 | 5/1982 | Colon et al. .................. | 428/343 X |
| 4,524,104 | 6/1985 | Hagio et al. .................. | 428/341 |
| 4,629,657 | 12/1986 | Gulati et al. .................. | 428/461 |
| 5,352,516 | 10/1994 | Therriault et al. ............. | 428/343 X |

*Primary Examiner*—Daniel Zirker
*Attorney, Agent, or Firm*—Sprung Horn Kramer & Woods

[57] ABSTRACT

A single-layered, plastic and elastic thermoplastic hot-melt adhesive film which does not have a separating layer, wherein it can be wound on and off a reel without the use of a supplementary separating material, is essentially free of antiblocking agents and/or lubricants and that the maximum of its thermoanalytically determined main melting peak is below 90° C. and which is essentially formed from at least two olefin copolymers with polar comonomers A and B, wherein ethylene is preferably used as an olefinic monomer, and whose essential comonomers contain oxygen atoms and the essential oxygen-containing comonomers in the olefin copolymers A and B are not identical, wherein the total proportion of oxygen-containing comonomer in the total weight of polymer resin forming the film is between 18 wt. % and 40 wt. % and the proportion of oxygen-containing comonomers in copolymer A is at least 60 wt. % of the total weight of oxygen-containing comonomers and copolymers A and B are mutually degraded under a sufficient shearing force for copolymer B to be present as a finely distributed second phase in copolymer A.

13 Claims, No Drawings

SINGLE-LAYERED HOT-MELT FILM ADHESIVE WHICH CAN BE WOUND ON A REEL WITHOUT USING RELEASE OR SEPARATING AGENTS RUNS EASILY ON MACHINES AND IS MADE FROM OLEFIN COPOLYMERS

The invention relates to single-layered hot-melt adhesive films made from polar olefin copolymers for two-dimensional fixing or bonding of other substrates. They can be wound up and unwound without using separating agents or separating sheets. The films run easily on machines due to their rough surface. The polar comonomers used contain oxygen atoms.

Thermoplastic hot-melt adhesive films according to the invention are particularly suitable for bonding products based on cellulose as well as for bonding plastics, in particular they are suitable for bonding polyolefins. They are especially suitable for bonding materials produced in web shape such as papers, cards, films, woven fabrics and non-wovens. They may also be used for fixing and sealing applications. Due to their thermoplastic character they are suitable for repeated melting processes and they thus provide the opportunity of subsequently separating laminated materials which have been built up by using them. The substrates used to produce this type of laminated products can thus also be taken to a materials recycling process.

For the purposes of the present invention, a hot-melt adhesive film is understood to be a film based on thermoplastic plastics, which is in the molten state suitable for bonding to other substrates due to its surface stickiness and flow properties as well as to its thickness.

It is known that olefin copolymers using comonomers containing oxygen atoms are suitable for use as hot-melt adhesives or as components of formulations for hot-melt adhesives. The copolymers are described, for instance, by Saechtling in: Kunststoff Taschenbuch, 24th ed., Hanser Verlag, Munich 1989, p. 243–246 or by Dominighaus in: Die Kunststoffe und ihre Eigenschaften, 4th ed., VDI Verlag, Düsseldorf 1992, p. 82–123.

Oxygen-containing olefin copolymers are known for their elastic characteristics and improved adhesive properties. Applications implemented in accordance with the prior art include use as adhesion promoters or sealing layers in coextruded films, but adhesive coatings on metals, glass and paper are also known.

The most important polar comonomeric units contained in olefin copolymers include vinyl acetate, in saponified and unsaponified form, acrylic acid and its esters and salts and methacrylic acid and its esters and salts.

Generally speaking, the tendency of the copolymer to crystallise decreases with increasing comonomer content so that, inter alia, flexibility, transparency and stress cracking resistance increase or are improved, along with tackiness and the ability to be hot-sealed and welded. Moreover, since the melting point is lower, polar olefin copolymers are ideal for use as raw materials for hot-melt adhesive applications, wherein copolymers with high comonomer contents, 18–40 wt. %, are used for this purpose. The mechanism of improved adhesion is explained, for example, by Elias in: Makromoleküle, vol. 2, 5th ed., Hüthig & Wepf Verlag, Basle 1992, p. 134–135. Depending on the substrates to be bonded and their surfaces, materials with good flow properties, i.e. high melt flow indices, are used as hot-melt raw materials. Polar olefin copolymers with melt flow indices from less than 0.1 g/10 min to more than 500 g/10 min, each being measured according to DIN 5 37 35 at 190° C. and with a test load of 2.16 kg, are obtainable on the market.

As is known, the adhesive power of the olefin copolymers increases with increasing comonomer content. Copolymers with comonomer contents of more than 16 wt. % are generally used for hot-melt adhesive films. However, the processing possibilities are also reduced with increasing comonomer content. Whereas films can be obtained without great difficulty from polar copolymers with comonomer contents of less than 10 wt. %, it is equally well-known that materials with comonomer contents from 16 wt. % upwards block on the reel. The transparency and gloss of the films obtained increase with increasing comonomer content, the surface of the semi-finished products is becoming smoother.

Addition of known antiblocking and mould release agents cannot be utilised or has undesirable side effects in the case of hot-melt adhesive films because the adhesive strength of the films is reduced by these materials to the extent that the additives coat the surface of the films. Addition of inorganic spacers, which are discretely distributed in the polymer matrix, for instance, result in a decrease in adhesive power, proportional to the additive content. The addition of mould release agents, often waxy substances, which migrate out of the polymer matrix due to their incompatibility with the polymer and form a film on the surface of the polymer film, causes a drastic loss of adhesive strength, depending on the circumstances.

Due to the plastic character of the copolymers and their low softening or melting points, films made from these materials also possess the disadvantage that they have very smooth surfaces which thus gives the films a blocking character. This impairs the ability to run easily on machines, the films always have to be guided by means of moveable parts or with webs of separating material in order to prevent bonding to stationary parts which could cause an interruption in the process.

Another way of processing blocking copolymers into films is the integration into multi-layered structures in which the various layers stick together only as long as they are warm and do not block against each other in the cold. Thus the publications U.S. Pat. No. 4,629,657, EP 0 424 761 and EP 0 263 882 describe polyolefin films coated with materials which are coated with hot-melt adhesive resins. In this case, the less tacky layer takes on the function of a separating layer. These films have the disadvantage that they have only one face with hot-melt adhesive properties, moreover the bonding strength which can be reached is low and the final products possess a not inconsiderable tendency to roll up. The layers made from mixtures of polar olefin copolymers mentioned in EP 0 424 761 were not processed to give individual, self-supporting layers. Moreover, they possessed a separating or backing layer made of polypropylene so that they did not come into contact with themselves on a reel.

When being used as fixing media, moreover, it is a disadvantage if the parts to be fixed cannot be adjusted against each other due to the blocking capacity of the material.

The use of separating materials is generally commonplace when processing these materials to give mono-layered sheets. Universally known sheets of separating materials for use consist, for example, of siliconised paper, fabrics or films.

The disadvantage of separating films or other sheet materials, such as they are mentioned, for example, in DE 2 114 065, is that they require additional storage and processing capacities. Since the separating materials can never be completely recycled, separating materials represent both a financial and ecological burden. In addition, if separating materials were not used, there would no longer be the risk of substances migrating out of or from the separating material, depositing these onto the hot-melt adhesive film and thus impairing the adhesive effect.

The object for the inventors, therefore, was to provide a single-layered film with a high adhesive strength for thermal backing, sealing and fixing processes, which can be wound up without the use of separating agents and can run on currently available hot melt laminating machines and fixing presses without the tendency to block.

Moreover, it should be possible to optimalize the composition according to the substrates to be bonded. It should be possible to melt it repeatedly so that subsequent adjustment of fixed substrates or separating of the substrates is possible.

According to the invention, production of such a thermoplastic hot-melt adhesive film, capable for use in thermal lamination by applying heat and optionally pressure and which may be wound onto a reel, is achieved by mixing different polar olefin copolymers which contain oxygen atoms and in which the essential polar comonomers are not identical. Ethylene is preferred as an olefinic comonomer. To obtain a film according to the invention, at least two different polar, oxygen-containing olefin copolymers A and B have to be mixed and melted together under sufficient shear. The total proportion of polar oxygen-containing comonomer units should be between 18 wt. % and 40 wt. %, with reference to the total weight of polymer resin used. The olefin comonomer A should be present in larger amounts, with a total proportion of at least 60% of the total weight of comonomer units. The film according to the invention is essentially free of conventional antiblocking agents and/or lubricants.

To a person skilled in the art, it was surprising that a mixture of at least two polar olefin copolymers A and B with a high proportion of polar comonomer units could be processed to give a film with a sufficiently rough surface so that no blocking occurs on the reel. Due to the surface roughness, the filmplies on the reel do not lie flat against each other, but make contact only at raised points at particular locations in the film. The effect is supported by the amount of air trapped in the coil by the uneven film so that no blocking takes place.

In a preferred embodiment, the comonomers used for the polar olefin copolymers A and B are methacrylic acid and/or its salts and/or esters and/or acrylic acid and/or its salts and/or its esters and/or vinyl acetate, in the unsaponified and/or saponified form.

In a preferred embodiment, the film consists essentially of polar oxygen-containing olefin copolymers whose comonomer content is selected so that the total proportion of polar, oxygen-containing comonomers in the copolymers forming the film is between 22 wt. % and 28 wt. %.

In a preferred version, the minimum proportion of comonomer in copolymer B, contained to a smaller extent in the film, is at least 1.5 wt. % and the maximum of the more highly represented comonomer in copolymer B is 26.5 wt. %.

In a preferred version of the film, copolymer A is an ethylene/vinyl acetate copolymer whose minimum proportion of unsaponified vinyl acetate units is 18 wt. %, with reference to the total weight of copolymer A. The group consisting of
B1 ethylene/ethyl acrylate copolymer and/or
B2 ethylene/acrylic acid copolymer
is used as copolymer B.

In a preferred embodiment the film according to the invention contains 50 wt. % to 95 wt. %, preferably 65 wt. % to 95 wt. % of an unsaponified ethylene/vinyl acetate copolymer as copolymer A, 10 wt. % to 50 wt. % in particular 10 wt. % to 35 wt. % of the ethylene/ethyl acrylate copolymer B1 and/or 5 wt. % to 35 wt. %, preferably 8 wt. % to 20 wt. %, of the ethylene/acrylic acid copolymer B2 and optionally 5 wt. % to 20 wt. % of a polybutene B3, in particular polybuten-1.

In a particularly preferred embodiment the hot-melt adhesive film consists, apart from possibly present conventional additives such as, for example, stabilisers, of ethylene/vinyl acetate copolymer as copolymer A and the copolymers B1, B2 and optionally B3 mentioned above.

If an unsaponified ethylene/vinyl acetate copolymer is used as copolymer A, then in a preferred embodiment it contains 70 wt. % to 90 wt. %, in particular 75 wt. % to 87 wt. %, of polymerised ethylene units, wherein in a particularly preferred version, the remaining proportion consists essentially or completely of polymerised vinyl acetate. The ethylene/ethyl acrylate copolymer B1, in this preferred embodiment, contains essentially polymerised ethylene units, in particular at least 88 wt. % of polymerised ethylene units, in particular 88 wt. % to 92 wt. % of polymerised ethylene units, wherein the remaining proportion consists essentially or completely of polymerised ethyl acrylate. The ethylene/acrylic acid copolymer B2, in this preferred embodiment, consists essentially of polymerised ethylene units, in particular at least 85 wt. % of polymerised ethylene units, particularly preferably up to 85 wt. % to 95 wt. % of polymerised ethylene units, wherein the remaining-proportion consists essentially or completely of polymerised acrylic acid.

To prepare films, olefinic hot-melt adhesive raw materials with comparatively low melt flow indices, i.e. considerably less than 100 g/10 min at 190° C. and 2.16 kg (DIN 5 37 35), are preferably used. With porous substrates, viscous flow has the advantage that the film used remains in existence as such on the surface of the substrate and merely the cavities are filled up.

Selecting the melt flow index enables adaptation to the surface structure of the substrate and processing machines, copolymers with high melt flow indices being used for porous, rough surfaces and also for low processing pressures, while copolymers with low melt flow indices are used for comparatively fine to smooth substrates and high processing pressures.

Copolymers with a melt flow index of 0.1 g/10 min to 50 g/10 min at 190° C. and 2.16 kg test load (DIN 5 37 35), preferably between 0.1 g/10 min and 20 g/10 min, are used for films according to the invention. Generally, copolymer A has a lower melt flow index than copolymer B.

If an ethylene/vinyl acetate copolymer is used as copolymer A, then in a preferred version it has a melt flow index of 0.1 g/10 min to 15 g/10 min at 190° C. and 2.16 kg test load (DIN 5 37 35), particularly preferably of 0.3 g/10 min to 8 g/10 min. In this preferred version, copolymers B have a melt flow index of 1 g/10 min to 20 g/10 min at 190° C. and 2.16 kg test load (DIN 5 37 35), preferably of 3 g/10 min to 10 g/10 min.

By varying the copolymers, it is possible to adapt the adhesive properties to the particular substrate. If a high proportion of acid copolymers or ionomers is selected, better bonding properties to metal or glass can be realized, with a high proportion of vinyl acetate units, adhesion to paper and cellulose-based products is optimised.

An important factor in producing the ability to be wound up without the use of a separating material is the formation of a sufficiently rough surface, which only takes place if the polar copolymers used possess comonomers which produce domains even in the melt so that a demixing structure may be referred to. It was not obvious that comonomers in the polar olefin copolymers were sufficiently insoluble in each other for the required demixing structure to be produced. In addition, melting of the raw material mixture consisting of different polar olefin copolymers must take place under sufficient shear for the larger domains to be distributed in the melt at the rate of shear because otherwise the demixing structures emerging from the film die can achieve such large dimensions that, as gelled bodies, they interfere with the process of producing a consistent film. They are the source of undesirably high thickness tolerances and possible breaks in the melt being drawn to form a film.

The melt can be subjected to a shearing force in dies preferred for the production of films, these working on the screw principle, in mixing units connected in series or also in film extrusion machines. The shearing force is preferably applied to the melt in a degradation die which operates on the screw principle and/or in a dynamic mixing unit connected directly in series.

Films according to the invention can be produced by the flat film or by the blown film process. In a preferred version, the films are prepared by the blown film process. The blown film process enables flexible adjustment of the processing width to market requirements by means of different blow-up ratios.

In a preferred version, films according to the invention have a thickness of 20 μm to 200 μm and in a particularly preferred version, between 30 μm and 70 μm.

Constituents of hot-melt adhesive films according to the invention may also be conventional additives and auxiliary substances, these being, for example, stabilisers, optical brighteners, colorants and nucleating agents. Even conventional hydrocarbon-tackyfier-resins can be used as additives in the films according to the invention.

Common additives and auxiliary substances are described by Gächter and Müller in: Taschenbuch der Kunststoff-Additive, 2nd ed., Hanser Verlag, Munich 1983.

The surface properties of films according to the invention can be adapted to the substrates being bonded by using common surface treatment methods, preferably corona, flame and/or fluorine treatment. Various processes for modifying the surface are described, for example, by Gerstenberg in: Coating 4/93, p. 119–122.

The invention also provides a process for producing composite materials from any substrates and a film according to the invention, characterised in that the film is bonded to at least one substrate using heat and preferably only a small pressure. In a preferred version, the film is laid between two different substrates and bonds these after bringing them together and applying heat and pressure.

The substrates concerned are preferably sheet or web shaped materials or sections thereof. Examples of this type of sheet or web shape material are, woven goods, non-wovens, films, papers, cards and cardboard packaging. They consist of cellulose or cellulose-containing products, other plant-based products, fibrous materials, plastics or also metals.

The invention also provides offcuts or sections of film, generally produced by punching or cutting, and their use for fixing and/or sealing materials or items against each other characterised in that off-cuts or sections of films according to the invention are placed between two identical or different materials or items and bonding in the form of sealing or fixing takes place under the effect of heat and optionally pressure. Materials which are suitable for bonding in this way are preferably cellulose or cellulose-containing products such as paper or cardboard, woods, fibrous materials obtained from plants or animal products, plastics, metals and glass.

The composite materials and/or bonds according to the invention are thermoreversible. They can, therefore, be taken apart again after use so that the materials used can be made available for material recycling.

EXAMPLES

Example A

A mixture of 80 wt. % of an ethylene/vinyl acetate copolymer and 20 wt. % of an ethylene/methyl acrylate copolymer were melted in an extrusion die under the influence of shear and with the application of heat. The ethylene/vinyl acetate copolymer had a melt flow index of 2 g/10 min, measured according to DIN 5 37 35 at 190° C. under a test load of 2.16 kg. The proportion of vinyl acetate in the copolymer was 18 wt. %. The ethylene/methyl acrylate copolymer had a melt flow index of 4 g/10 min, measured according to DIN 5 37 35 at 190° C. under a test load of 2.16 kg. The proportion of methyl acrylate in this copolymer was 24 wt. %. A tubular film was formed from the melt using a blown film machine, collapsed and wound onto a reel. Samples for determining the comparison properties could be unrolled from the reel without any problem after waiting several days. The film samples obtained had a thickness of 70 μm.

Example B

A mixture of 82 wt. % of an ethylene/vinyl acetate copolymer and 18 wt. % of an ethylene/acrylic acid copolymer were melted in an extrusion die under the influence of shear and with the application of heat. The ethylene/vinyl acetate copolymer had a melt flow index of 2 g/10 min measured according to DIN 5 37 35 at 190° C. under a test load of 2.16 kg. The proportion of vinyl acetate in the copolymer was 25 wt. %. The ethylene/acrylic acid copolymer had a melt flow index of 8 g/10 min, measured according to DIN 5 37 35 at 190° C. under a test load of 2.16 kg. The proportion of acrylic acid in this copolymer was 12 wt. %. A tubular film was formed from the melt using a blown film machine, collapsed and wound onto a reel. Samples for determining the comparison properties could be unrolled from the reel without any problem after waiting several days. The films obtained were 70 μm thick.

Comparison Example C

An ethylene/vinyl acetate copolymer with a proportion of vinyl acetate of 18 wt. % was melted using the same extrusion die as was used in examples A and B, under the influence of shear and with the application of heat, and extruded to form a tubular film. The ethylene/vinyl acetate copolymer had a melt flow index of 2 g/10 min measured at 190° C. under a test load of 2.16 kg (DIN 5 37 35). The collapsed film blocked on the reel. By inserting siliconised separating paper, film samples, also with a thickness of 70 μm, could be obtained, these being used to test the comparison properties.

The characterisation data given in the following Table obviously show that the films according to the invention are superior to a comparison film made from a copolymer containing only one comonomer.

TABLE 1

Properties of the films prepared within the context of the examples and comparison example.

| Property | Method of determ. | Unit | Example A | Example B | Comp. example C |
|---|---|---|---|---|---|
| Ability to be wound on a reel | ./. | ./. | yes | yes | no |
| Coeff. of static friction in a film/metal contact | DIN 5 33 75 | ./. | 0.63 | 0.74 | 0.90 |
| Coeff. of sliding friction in a film/metal contact | DIN 5 33 75 | ./. | 0.69 | 0.78 | 1.00 |
| average roughness | DIN 4 76 81 | μm | 0.29 | 0.35 | 0.10 |
| melting point | ASTM D3418 | °C. | 83 | 75 | 85 |
| standard blocking value/50° C. | DIN 5 33 66 | N/cm$^2$ | 0.10 | 1.44 | blocked |

The surface roughness of the example films according to the invention is more than double that of the comparison example film. This results in the ability to be wound on a reel without using a separating agent, which cannot be produced with the film from the comparison example, although the melting point, and thus also the crystallisation point, were shifted to lower temperatures. The lower values for coefficients of static and sliding friction, determined in a film-to-metal contact, for the films described in examples A and C as compared with the comparison film formed from only one polar olefin copolymer prove the better machinability of the films according to the invention, due to the ability to slide more easily over machine parts. In a standard blocking test at 50° C., values could be determined for films A and B according to the invention, whereas the comparison film C was already blocked. The higher values for the coefficients of static and sliding friction and for standard blocking for example B as compared with example A are produced by the higher total comonomer content of the raw materials mixture used for example B as compared with that for example A. The film produced in example C had a lower total comonomer content than that produced in examples A and B. Since, however, only one comonomer component was introduced in comparison example C, the film described in comparison example C had a much smoother surface. That is why it was already blocked on the reel. This result is also verified by the standard blocking test which showed that at 50° C. the films from the examples were still not blocked, while the film from comparison example C was already blocked and could not be separated.

We claim:

1. A single-layered, plastic and elastic thermoplastic hot-melt adhesive film which does not have a separating layer, which has a high adhesive strength for thermal backing, sealing and fixing processes, which can be wound up without the use of separating agents and can run on hot melt laminating machines and fixing presses without the tendency to block, is essentially free of antiblocking agents and lubricants, which has a maximum thermoanalytically determined main melting peak below 90° C. and which is essentially formed of at least two olefin copolymers, one comprising ethylene and at least one oxygen-containing comonomer A and the other comprising ethylene and at least one different oxygen-containing comonomer B, A and B each being selected from the group consisting of acrylic acid, methacrylic acid, a salt or ester of either and vinyl acetate optionally saponified, wherein the total proportion of oxygen-containing comonomer in the total weight of polymer resin forming the film is between 18 wt. % and 40 wt. % and the proportion of oxygen-containing comonomers in copolymer A is at least 60 wt. % of the total weight of oxygen-containing comonomers, and the A-containing copolymer and the B-containing copolymer are mutually degraded under a sufficient shearing force for the B-containing copolymer to be present as a finely distributed second phase in the A-containing copolymer.

2. A film according to claim 1, wherein the total proportion of oxygen-containing comonomers in the total weight of polymer resin forming the film is at least 22 wt. % and at most 28 wt. %.

3. A film according to claim 1, wherein the minimum proportion of comonomer B in the total weight of polymer resin forming the film is 1.5 wt. % and the maximum proportion of comonomer A in the total mass of the polymer resin forming the film is 26.5 wt. %.

4. A film according to claim 1, wherein the film contains essentially ethylene and vinyl acetate units as comonomer A, wherein at least 18 wt. % are vinyl acetate comonomer units, with reference to the total weight of vinyl acetate copolymer used, and the B-containing copolymer is selected from the group consisting of B1 an ethylene/ethyl acrylate copolymer and B2 an ethylene/acrylic acid copolymer.

5. A film according to claim 1, wherein the film contains at least three copolymers, i) one present in 50 to 95% by weight and including comonomer A, ii) one present in 10 to 50% by weight and including one comonomer B, and iii) one present in 5 to 35% by weight and including a different comonomer B.

6. A film according to claim 1, wherein the copolymers each contain ethylene in the following percentages by weight:

i) at least 70%, ii) at least 88%, and iii) at least 85%.

7. A film according to claim 1, additionally including polybutene.

8. A film according to claim 1, having a thickness from 20 to 200 μm.

9. A film according to claim 1, having a thickness from 30 to 70 μm.

10. A film according to claim 1, having been produced by the blown film method.

11. A film according to claim 1, subjected on at least one of its surfaces to corona, flame or fluorine treatment.

12. A film according to claim 1, joined by heat and pressure to a substrate thereby to form a composite material.

13. A film according to claim 1, joined by heat and pressure to a substrate selected from the group consisting of paper, cardboard, plastic, metal, wood, glass, cloth, fabric, a non-woven mat, a plant product and a net to form a composite material.

* * * * *

UNITED STATES PATENT AND TRADEMARK OFFICE
CERTIFICATE OF CORRECTION

PATENT NO. : 5,593,775
DATED : January 14, 1997
INVENTOR(S) : Hargarter, et al.

It is certified that error appears in the above-indentified patent and that said Letters Patent is hereby corrected as shown below:

On the title page: Item

[56] References Cited U.S. Patent Documents:
insert -- 5,126,197  6/1992  Schinkel, et al...
5,300,360  4/1994  Kocsis, et al... --

Insert -- FOREIGN PATENT DOCUMENTS:
0424761  5/1991  European Pat. Off.
0424724  5/1991  European Pat. Off. --

Signed and Sealed this

Seventeenth Day of June, 1997

Attest:

BRUCE LEHMAN

*Attesting Officer*     *Commissioner of Patents and Trademarks*